Aug. 7, 1962 J. B. NEALE 3,048,313
AUTOMATIC WIRE-BREAKING DEVICE
Filed June 20, 1958 2 Sheets-Sheet 1

INVENTOR:
JUNIUS B. NEALE,
BY *Nathan Sompter*
HIS ATTORNEY.

Aug. 7, 1962  J. B. NEALE  3,048,313
AUTOMATIC WIRE-BREAKING DEVICE
Filed June 20, 1958  2 Sheets-Sheet 2

INVENTOR:
JUNIUS B. NEALE,
BY *Nathan Longfeld*
HIS ATTORNEY.

United States Patent Office 3,048,313
Patented Aug. 7, 1962

3,048,313
AUTOMATIC WIRE-BREAKING DEVICE
Junius B. Neale, Owensboro, Ky., assignor to General Electric Company, a corporation of New York
Filed June 20, 1958, Ser. No. 743,440
6 Claims. (Cl. 225—106)

This invention relates to automatic wire-breaking devices, and more particularly to an automatic wire-breaking device for use with automatic machines for making grid electrodes of the type commonly used in electron discharge tubes.

Such grid electrodes consist of one or more parallel support rods having a helix of a number of turns of relatively fine wire wound thereon and secured thereto at each point of contact.

Machines for making such grid electrodes generally comprise means for forming a series of notches in parallel support rods longitudinally fed, means for winding a helix of relatively fine wire about the support rods so that the turns of wire lie in longitudinally successive notches, and means for peening the metal of the support rods so as to close the notches over the fine wires lying therein, thereby securing the wire helix to the support rods to maintain the assembled relation of the elements of the completed grid electrode. A machine of this general type is shown in U.S. Patent No. 1,838,819 to Flaws, Jr., assigned to the same assignee as the present application.

It is customary to provide means for rotating and longitudinally feeding the support wires during the operation of the grid making machine, in order to wind the fine wire about the support rods in helical form. It is also common practice to manufacture grids on such machines in the form of continuous strips, by winding helices of fine wire successively on support rods of indefinite length. The winding operation is carried out by feeding wire about a rotating mandrel which receives the support rods in longitudinal grooves formed in its periphery, as the support rods are longitudinally fed along the mandrel.

In order to form grid electrodes on a support rod at longitudinally spaced intervals, it is necessary to provide means for breaking the wire at successive intervals as it is drawn onto the mandrel, by the rotation thereof, from supply reels.

It is the object of my invention to provide an improved automatic wire-breaking device automatically breaking fine wire being wound about support rods in this type of grid making machine, at predetermined spaced intervals along the wire, in synchronism with the gride electrode forming operations of such a grid-making machine.

Further objects and advantages of my invention will be apparent from the following description. Although only a single embodiment is shown and described by way of example, many modifications will occur to those skilled in the art, and it should be understood that the invention may be adapted for use in any application in which it is required to break an indefinite length of longitudinally fed wire at spaced intervals, in synchronism with the automatic operations of an associated wire-consuming machine.

Briefly, in accordance with one aspect of this invention, I provide a movable clamping arm, which is automatically actuated at predetermined intervals into wire-clamping cooperation with a stationary clamping arm by a slide member. The slide member is driven and controlled by cam means operated in synchronism with the operations of an associated wire-consuming machine, such as an automatic grid-making machine. The machine continually feeds the wire longitudinally through the space between the arms, cooperating with the arms in the wire-clamping position to break the wire in tension. A first cam and a rocking lever are driven by a first shaft of the wire-consuming machine to limit and control spring-biased movement of the slide member into a clamping arm-actuating position, and to return the slide member to an inoperative position after an interval. A set of second cams are driven by a second shaft of the wire-consuming machine to actuate a set of latch levers into latching engagement with the slide member, to secure the slide member in the inoperative position against spring-biased movement for a subsequent interval.

For a better understanding of the invention, reference may be had to the accompanying drawings, in which.

Figure 1:
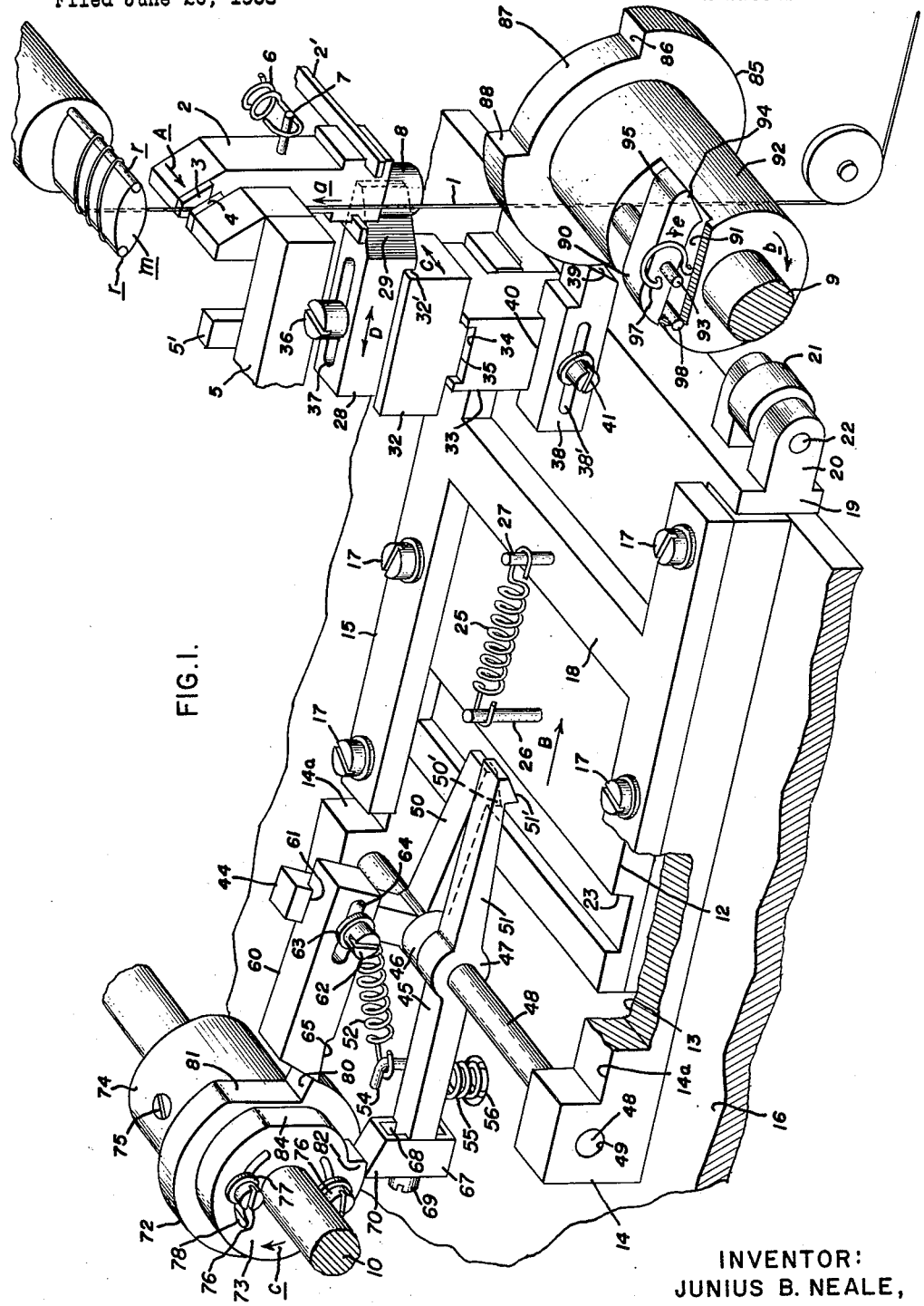
FIG. 1 is a pictorial view of my improved wire-breaking device, having certain parts broken away more clearly to illustrate the construction and arrangement thereof.

Referring to FIG. 1, a fine wire 1 is drawn in the direction shown by the arrow a by a wire-consuming machine (not shown), associated with my improved wire-breaking device, such as an automatic grid-making machine. In the specific application contemplated, the wire is drawn about a rotating mandrel m carrying support rods r, and is wound about the support rods r and the mandrel to form a grid electrode; these means form no part of this invention, however, and will not be further described. However, the relation of the wire-breaking device of this invention to a wire-feeding mechanism and wire consuming machine is clearly set forth in a copending application of Marvin C. Eans, Jr., S.N. 702,592, filed December 13, 1957, entitled "Wire Dispensing Apparatus," now Patent No. 2,981,491, Patented April 25, 1961, and assigned to the assignee of this application.

In order to break wire 1 at spaced intervals along its length, I provide a clamping arm 2 which is slidably mounted in the associated machine by track or rail means 2' to restrain it from any motion other than a sliding motion in the direction indicated by arrow A. Clamping arm 2 carries a jaw 3 for engaging wire 1, and is slidable in the direction of the arrow A into wire-clamping engagement with a jaw 4 supported by a stationary clamping arm 5. Clamping arm 5 is supported in a stationary position by suitable portion 5' of the machine structure. Jaws 3 and 4 thus can engage wire 1 in clamping relation, and the continued longitudinal feeding or drawing of the wire by the associated machine causes the wire to break in tension.

Clamping arm 2 is urged away from clamping relation with wire 1 by means of a tension spring 6, which is secured to the clamping jaw by means of a pin 7, threaded into the clamping arm. Tension spring 6 is fixedly secured to the machine structure by any suitable means (not shown). In order to provide for the actuation of clamping arm 2 into clamping relation with wire 1 against the bias of tension spring 6, a cam follower 8 is provided on the opposite end portion of clamping arm 2.

In order to actuate clamping arm 2 in synchronism with the operations of the associated machine, I provide actuating means driven by shafts of the machine, in synchronism with the operations thereof. These shafts include a first shaft 9 driven at a relatively high speed in the direction shown by the arrow b, and a second shaft 10 driven at a relatively low speed in synchronism with shaft 9, in the direction shown by the arrow c.

Means are provided for the actuation of clamping arm 2 by shafts 9 and 10, including a slide member 12, slidably mounted within a groove 13 milled in a base member 14. Groove 13 defines upstanding flanges 14a extending along the lateral edges of base member 14. Slide member 12 is restrained to sliding motion in the directions of arrow B by means of a cover plate 15 of generally H-shaped configuration, including a cross-bar 18, which overlies both the slide member and base member 14. Base member 14 and cover plate 15 are secured to the associated machine part 16 by means of a plurality of machine screws 17 threaded through the cover plate and base member, and into part 16 of the machine.

Slide member 12 is of generally rectangular configuration, but is provided with a lateral extension 19 formed with brackets 20 extending from an end thereof, and beyond base member 14. A roller 21 is rotatably mounted in brackets 20 by means of a pin 22 passing through the roller and the brackets. Near its opposite end, slide member 12 is provided with a latching slot 23, formed in the upper surface of the slide member.

Figure 3:
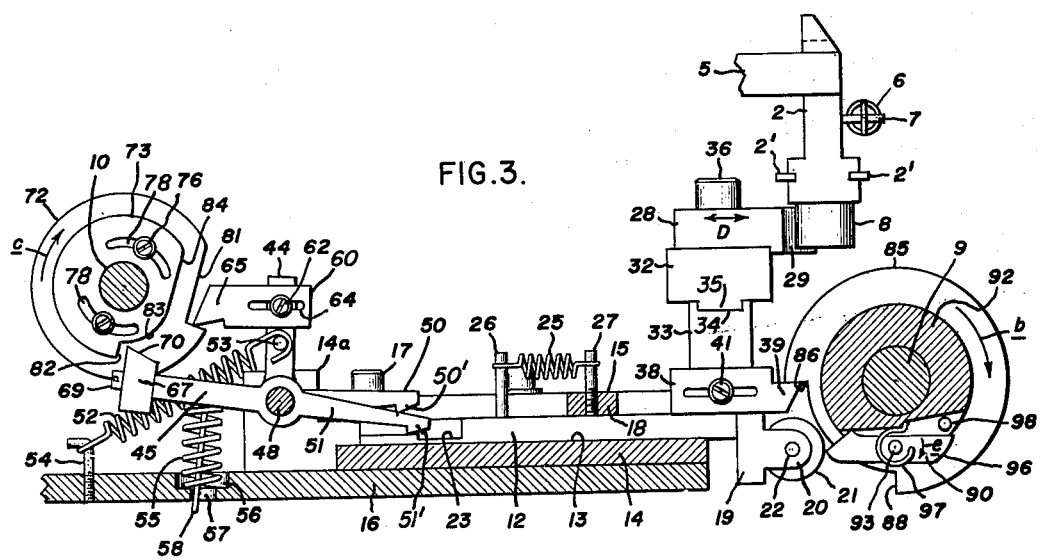
FIG. 3 is a similar transverse sectional view, showing the elements of the wire-breaking device in a wire-breaking position.

Means are provided for biasing roller 21 and slide member 12 outwardly from base member 14 in the direction of arrow B, and toward the position shown in FIG. 3. These means generally comprise a tension spring 25 and threaded pins 26 and 27. Pin 26 is threaded into the upper surface of slide member 12, and pin 27 is threaded into cross-bar 18 of cover plate 15. The ends of tension spring 25 are secured about these pins so that they are urged together, thus urging slide member 12 and roller 21 outwardly from base member 14.

In order to actuate clamping arm 2 into clamping relation with wire 1 upon outward movement of slide member 12 from base member 14 to the position shown in FIG. 3, a pawl 28 is adjustably mounted on the slide member in such a position that a diagonal surface 29, formed at the end of the pawl, engages cam follower 8 to actuate clamping arm 2. Means for adjustably mounting pawl 28 on the slide member are provided, comprising slide blocks 32 and 33. Slide block 33 is provided with a slide groove 34, and slide block 32 is formed with a rectangular projection 35 slidingly received in groove 34 for adjustment in the direction of arrows C. Similarly, slide block 32 is provided with a slide groove 32' receiving pawl 28 in sliding engagement for adjustment in the direction of arrow D, generally transverse to the directions of arrows C. Pawl 28 is formed with an opening 37 elongated in the direction of arrows D, and slide block 32 is similarly formed with an opening (not shown) elongated in the direction of arrows C. Blocks 33 and 32 and pawl 28 are secured in adjusted relationship upon the upper surface of slide member 12 by means of a machine screw 36, passing through the elongated openings of pawl 28 and block 32, through a suitably formed opening in block 33, and threaded into the upper surface of the slide member. The slide blocks and pawl are secured by machine screw 36 in an adjusted position to produce engagement of diagonal surface 29 of pawl 28 with cam follower 8 in the position of slide member 12, as shown in FIG. 3, such as to drive clamping arm 2 into clamping relation with wire 1 at the end of the path of motion of slide member 12 away from base member 14.

A pawl 38 for limiting motion of slide member 12 relative to base member 14 is provided, and is formed with a projecting tooth 39. Pawl 38 is secured within a suitably formed groove 40 in slide block 33, by means of a machine screw 41 passing through an elongated opening 38' in pawl 38 and threaded into the slide block 33.

Figure 2:
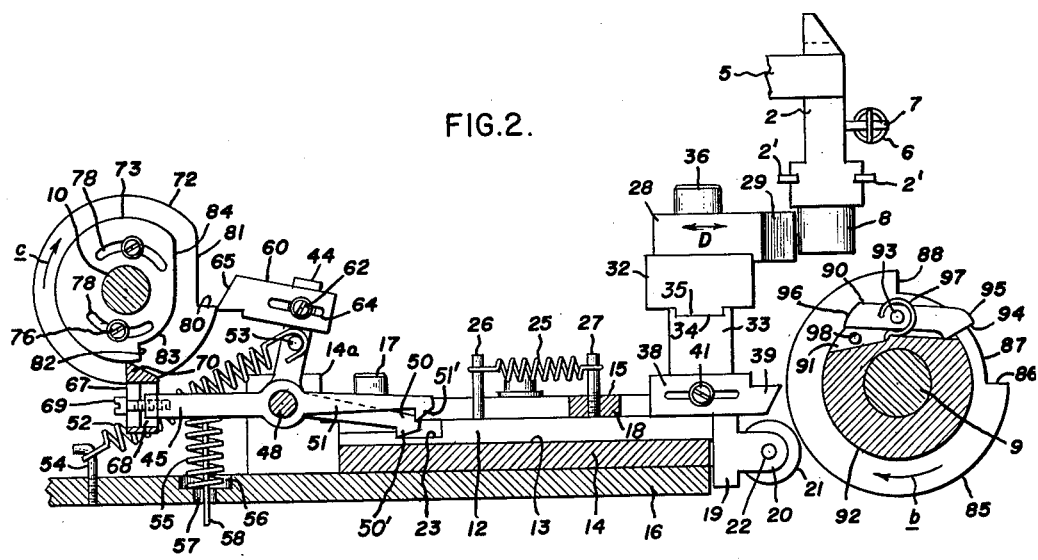
FIG. 2 is a transverse sectional view of the wire-breaking device in a phase of operation in which the wire is not broken.

Means for latching slide member 12 in the position shown in FIGS. 1 and 2 are provided, generally comprising latch levers 44 and 45. The latch levers are formed with cylindrical bosses 46 and 47, respectively, receiving an axle 48 therethrough. Axle 48 is inserted in suitably formed bores 49 in flanges 14a, which thus rotatably support the latch levers.

Latch lever 44 is formed with a latching arm 50 extending from boss 46, and generally overlying slot 23 of slide member 12. Latch lever 45 is similarly formed with a latching arm 51 extending from boss 47, and generally overlying slot 23. Arms 50 and 51 are provided with teeth 50' and 51', respectively, whereby the latching arms 50 and 51 may be rotated into selective latching engagement with slot 23.

Latch lever 44 is biased in a direction to disengage latching arm 50 from slot 23 by means of a tension spring 52. Spring 52 is secured at one end by means of a pin 53 (FIG. 2) threaded into latch lever 44, and is secured at its opposite end by means of a pin 54 threaded into portion 16 of the associated machine.

Latch lever 45 is biased in a direction to engage latching arm 51 with slot 23 by means of a compression spring 55, which is interposed between the latch lever and portion 16 of the associated machine. As best shown in FIG. 2, spring 55 is received within a counter-bore 56 of a bore 57 formed through portion 16 of the machine. A guide pin 58 is provided to prevent bowing of the compression spring, and is threaded into the lower surface of latch lever 45, passing through bore 57 with sufficient clearance to permit tilting resulting from rotation of the latch lever.

Latch lever 44 is provided with a pawl 60, which is adjustably mounted within a slot 61 (FIG. 1) suitably formed near the end of the latch lever. Pawl 60 is secured to latch lever 44 by means of a machine screw 62 and washer 63, threaded into the latch lever through an elongated slot 64 suitably formed in the pawl to permit adjustment of its position relative to the latch lever. Pawl 60 is formed with a projecting tooth 65.

Latch lever 45 is provided with a pawl 67 formed with a suitable slot 68 receiving the end of the latch lever. Pawl 67 is secured by means of a machine screw 69 passing through an opening in the pawl and threaded into the latch lever. Pawl 67 is formed with a projecting tooth 70.

As previously explained, tension spring 25 biases slide member 12 toward the position of FIG. 3, in which pawl 28 engages cam follower 8 to produce clamping engagement of clamping jaw 3 upon wire 1. In the position shown in FIGS. 1 and 2, latching arm 50 of latch lever 44 is positioned in slot 23 to restrain slide member 12 against the bias of spring 25. Means are provided for retaining latching arm 50 in this position against the bias of tension spring 52 during a portion of a cycle of operations, and for releasing this latching arm from latching engagement with the slide member during a remaining portion of a cycle. These means generally comprise a cam member 72 mounted upon shaft 10 for rotation therewith.

Further means are provided to hold latching arm 51 out of engagement with slot 23 during a portion of a cycle, against the bias of compression spring 55, and to release this latching arm for engagement with slot 23 during a remaining portion of the cycle. These means generally comprise a cam member 73 mounted upon shaft 10 for rotation with cam 72.

Cams 72 and 73 are adjustably mounted upon shaft 10 by means of a collar 74, which may be integral with cam 72 and secured to the shaft by means of a set screw 75, or other suitable fastening means. The cam 73 is secured to collar 74 and cam 72 by means of machine screws 76 and washers 77, spaced circumferentially about the cams. Cam 73 is formed with arcuate slots 78, and cam 72 is formed with tapped holes in which screws 76 are received.

Cam 72 is of generally circular form, having a precipice 80, and a chordate surface 81 affording a rise to the circular dwell surface. Cam 73 is also generally circular, and is formed with a precipice 82, a circular arcuate dwell surface 83, and a chordate surface 84 affording a rise to the circular dwell surface.

Means are provided to limit the motion of slide member 12 produced by the bias of tension spring 25 upon the release of the slide member by latching arms 50 and 51. These means generally comprise a cam member 85 mounted upon shaft 9 of the machine for rotation therewith, by any suitable means (not shown). Cam 85 is generally circular and is formed with a precipice 86 and a circular arcuate dwell surface 87 of reduced radius, which terminates in a second precipice 88. Cam 85 cooperates with pawl 38 to limit and control movement of slide member 12 in a direction to engage pawl 28 with cam follower 8.

In order to return the slide member from a position in which pawl 28 engages cam follower 8, a rocking lever 90 is provided. Rocking lever 90 is mounted in a recess 91 suitably formed in the periphery of a collar 92, which is received upon shaft 9 and secured for rotation therewith by any suitable means (not shown). Rocking lever 90 is pivotally mounted within recess 91 by means of a pin 93 passing axially through collar 92, recess 91, and the rocking lever. The rocking lever is formed with a detent surface 94 lying in a plane generally radial to shaft 9, and with clearance surfaces 95 and 96 lying in planes substantially tangential to the paths of rotation of points on these surfaces. A coil spring 97 is provided to bias rocking lever 90 about pin 93 in the direction shown by the arrow e. Spring 97 is secured at its opposite ends to rocking lever 90 and collar 92 by insertion in openings suitably formed in these members.

Detent surface 94 of rocking lever 90 is positioned to coact with roller 21 during the rotation of shaft 9, immediately after slide member 12 reaches the position of FIG. 3 and produces clamping engagement of clamping jaw 3 upon wire 1. This coaction produces rotation of rocking lever 90 against the bias of spring 97, in a direction opposite to the arrow e, as the rocking lever cooperates with roller 21 to return slide member 12 toward the position of FIG. 1. To limit the rotation of rocking lever 90 about pin 97, a stop pin 98 is passed axially through collar 92 and recess 91.

The operation of my improved automatic wire-breaking device will now be described with particular reference to FIGS. 2 and 3. In FIG. 2, slide member 12 is shown in position in which tooth 65 of pawl 60 rides upon the circular dwell surface of cam 72, under the bias of tension spring 52. In this position latching arm 50 of latch lever 44 engages slot 23 of slide member 12, thus securing the slide member in the position against the tension of spring 25. Tooth 70 of pawl 67 rides upon the circular dwell surface of cam 73, thus holding latching arm 51 of latch lever 45 out of contact with slot 23, against the bias of compression spring 55. Pawl 28, pawl 38, and roller 21 are thus held in positions such that the wire 1 is not in clamped relation with jaws 3 and 4.

As shaft 10 rotates in a synchronism with the associated machine in the direction shown by the arrow, tooth 65 of pawl 60 reaches precipice 80 of cam 72 and falls upon chordate surface 81 under the bias of tension spring 52, thus carrying latching arm 50 out of engagement with slot 23 and releasing slide member 12. Slide member 12 commences to move rapidly toward the position of FIG. 3, under the bias of tension spring 25. As shaft 10 continues to rotate, tooth 70 of pawl 67 reaches precipice 82 of cam 73 and moves toward the circular arcuate dwell surface 83 thereof, under the bias of compression spring 55. This movement causes latching arm 51 of latch lever 45 to fall upon the surface 12' of slide member 12 in sliding engagement, under the bias of spring 55. The slide member has moved sufficiently to prevent latching engagement of latching arm 51 with slot 23, and the slide continues to move toward the position of FIG. 3. Tooth 70 of pawl 67 is withheld from contact with dwell surface 83 by the engagement of latching arm 51 with slide member 12.

As the rotation of shaft 10 continues, tooth 65 of pawl 60 slowly return towards the circular dwell surface of cam 72, passing over chordate portion 81 of the cam surface. Tooth 70 of pawl 67 passes over circular arcuate dwell surface 83 of cam 73, dwelling in the same non-contacting position.

As slide member 12 travels toward the position of FIG. 3, tooth 39 of pawl 38 strikes the circular dwell surface of cam 85. It is to be noted that shaft 9 rotates at a relatively higher speed than shaft 10, such that tooth 39 reaches precipice 86 while pawls 60 and 67 continue to pass over surfaces 81 and 83, respectively. Tooth 39 falls toward circular arcuate dwell surface 87 of cam 85, under the continued bias of spring 25. Spring 25 simultaneously biases slide member 12 into a position in which surface 29 of pawl 28 strikes cam follower 8 of clamping arm 2 and drives the clamping arm into clamping relation with wire 1, in cooperation with clamping arm 5. The continued tension placed on wire 1 by the associated machine thereupon breaks the wire in tension between jaws 3 and 4 of the clamping arms.

Immediately after wire 1 has been broken by the clamping arms 2 and 5, detent surface 94 of rocking lever 90 is brought into coacting engagement with roller 21 carried by slide member 12. Continued rotation of shaft 9 causes rocking lever 90 to pivot about pin 93 against the bias of spring 97, due to the coaction of roller 21 and detent surface 94. The rotation of rocking lever 90 about pin 93 is limited by the abutment of the rocking lever upon stop pin 98. As shaft 9 continues to rotate, rocking lever 90 drives roller 21, together with slide member 12 and pawls 38 and 28, toward the position of FIG. 2, against the bias of tension spring 25. Surface 29 of pawl 28 is disengaged from cam follower 8, and tension spring 6 withdraws clamping arm 2 from clamping relation with wire 1.

At this time, other means associated with the machine, and forming no part of this invention, may act to pick up wire 1 from jaws 3 and 4 and feed it into the wire-consuming portions of the machine. As slide 12 and its associated elements reach the position of FIG. 1, roller 21 reaches clearance surface 95 on rocking lever 90. As continued rotation of shaft 9 carries detent surface 94 out of contact with roller 21, spring 97 returns rocking lever 90 to the position of FIG. 1, and away from contact with stop pin 98.

With the movement of slide member 12 and its associated elements toward the position of FIG. 1, latching arm 51 which, as previously explained, is in engagement with surface 12' of slide member 12 in spring-biased sliding relation during the preceding operations and falls into slot 23. Pawl 67 falls toward the dwell surface 83 of cam 73, under the bias of compression spring 55. Latching arm 51 thus retains slide member 12 in the inoperative position of FIG. 1, against the bias of spring 25, after rocking lever 90 clears roller 21.

As shaft 10 continues to rotate, tooth 65 of pawl 60 continues to ride over chordate surface 81 of cam 72, gradually returning latch lever 44 and latching arm 50 into the position of FIG. 2, in which the latching arm engages slot 23 to retain sliding member 12 against the bias of spring 25. During this interval, tooth 70 of pawl 67 reaches the chordate surface 84 of cam 73, and gradually moves latch lever 45 and latching arm 51 out of engagement with slot 23, against the bias of spring 55, thus returning these elements to the positions of FIG. 2. As teeth 65 and 70 reach the circular dwell surfaces of cams 72 and 73, respectively, the latch levers and latching arms attain the positions of FIGS. 1 and 2, holding slide member 12 inoperative during the continued rotation of shaft 10 and cams 72 and 73 to the original positions shown in FIG. 2.

It is to be noted that while shaft 9 rotates at a higher speed than shaft 10, shaft 9 has no effect upon the operation except during those intervals when slide member 12 is permitted by latch levers 44 and 45 to slide into cooperation with cam 85 and rocking lever 90.

It will be apparent from the foregoing description that I have provided an improved automatic wire-breaking device which is effective to break wire, longitudinally drawn by a wire-consuming machine, at periodic intervals in synchronism with the operations of the machine. It will be obvious to those skilled in the art that the embodiment of the invention herein shown and described is subject to many changes and modifications, without departing from the spirit and scope of the invention. It should therefore be understood that the invention is not limited to specific details of construction and arrangement thereof herein illustrated.

What I claim as new and desire to secure by Letters Patent of the United States is:

1. A wire-breaking device, comprising a first arm and a second arm movable into wire-clamping cooperation therewith, the wire to be broken being drawn through the space between said arms and to be broken in tension when said arms cooperate to clamp said wire; means for moving said second arm into said wire-clamping cooperation at predetermined intervals, comprising; a slide member, means for supporting said slide member for movement toward a first position to actuate said second arm into said wire-clamping cooperation and toward a second non-clamping position, means biasing said slide member toward said first position, means driven to selectively limit movement of said slide member toward said first position, means for returning said slide member from said first position to said second position, and latching means operable to selectively retain said slide member in said second position.

2. In a wire-breaking device of the type including a first arm and a second arm movable into wire-clamping cooperation therewith, and wire-consuming means for drawing said wire through said arms and for breaking said wire in tension when said arms cooperate to clamp said wire; a slide member, means for slidably supporting said slide member for movement toward a first position to actuate said second arm into said wire-clamping cooperation and toward a second inoperative position; a spring arranged to bias said slide member toward said first position, cam means for selectively limiting movement of said slide member toward said first position, lever means for returning said slide member from said first position to said second position, and latching means for selectively retaining said slide member in said second position; said cam means, said lever means, and said latching means being driven in synchronism by said wire-consuming means and cooperating with said spring to actuate said slide member between said first and said second positions in a predetermined cycle for intermittent cooperation of said arms with said wire-consuming means to break said wire.

3. The combination recited in claim 2, together with control means driven by said wire-consuming means for actuating said latching means in accordance with said predetermined cycle.

4. The combination recited in claim 3, in which said latching means comprises a first latch lever and a second latch lever, and said control means comprises a second cam cooperating with said first latch lever and a third cam cooperating with said second latch lever to control the movements thereof; together with a second spring biasing said first latch lever away from latching engagement with said slide member, and a third spring biasing said second latch lever into latching engagement with said slide member; said second cam constructed and arranged to selectively actuate said first latch lever into latching engagement with said slide member in said first position, and said third cam constructed and arranged to selectively release said second latch lever for actuation by said third spring into resilient engagement with said slide member during movement of said slide member between said first and said second positions, and into latching engagement with said slide member upon the return thereof to said first position.

5. The combination recited in claim 2, together with a rotatable shaft driven by said wire-consuming means, a pin supported for rotation with said shaft, said pin supporting said lever means for rotation with said shaft and for rocking motion about an axis parallel to the axis of rotation of said shaft and radially spaced therefrom, and a second spring biasing said lever means for rocking motion about said pin toward a retracted position, and a roller rotatably secured to said slide member; said roller positioned in said first position of said slide member for interference with said lever means in said retracted position upon rotation of said shaft, said interference producing rocking motion of said lever means about said pin to an extended position in which said lever means drivingly engages said roller to return said slide member toward said first position; said second spring biasing said lever means toward said retracted position upon said slide member reaching said first position.

6. For use with a wire-consuming machine longitudinally feeding an indeterminate length of wire; an automatic device for breaking said wire at predetermined intervals along the length thereof, comprising, in combination; a first arm and a second arm movable into wire-clamping cooperation therewith, a first shaft driven by said wire-consuming machine, a first cam and a rocking lever mounted upon said first shaft for rotation therewith, a second shaft driven by said wire-consuming machine, at least one cam mounted upon said second shaft for rotation therewith, a slide member, means supporting said slide member for movement toward a first position to actuate said movable arm into wire-clamping cooperation with said fixed arm and into a second inoperative position, at least one latch lever rotatably mounted for selective actuation by said second cam into latching engagement with said slide member in said second position, and spring means biasing said slide member toward said first position; said spring means driving said slide member into engagement with said first cam upon release of said slide member by said latch lever; said first cam constructed and arranged to selectively permit movement of said slide member by said spring means into said first operative position to drive said movable arm into wire-clamping cooperation with said fixed arm, such that continued feeding of said wire by said wire-consuming machine breaks said wire in tension; said rocking lever subsequently driving said slide member from said second position to said first position upon continued rotation of said first shaft.

References Cited in the file of this patent

UNITED STATES PATENTS

| 1,208,863 | Waldow | Dec. 19, 1916 |
| 1,925,884 | Steele | Sept. 5, 1933 |
| 1,947,449 | Anderson et al. | Feb. 20, 1934 |
| 2,441,228 | Schneider et al. | May 11, 1948 |
| 2,586,629 | Englert | Feb. 19, 1952 |
| 2,818,958 | Toeppen et al. | Jan. 7, 1958 |

FOREIGN PATENTS

| 161,001 | Australia | Feb. 8, 1955 |